US012716705B2

(12) United States Patent
Ferretti

(10) Patent No.: US 12,716,705 B2
(45) Date of Patent: Aug. 25, 2026

(54) TACTILE ROUGHNESS DETECTION TOOL

(71) Applicant: Ferry Machine Corporation, Little Ferry, NJ (US)

(72) Inventor: Louis A. Ferretti, Pompton Plains, NJ (US)

(73) Assignee: Ferry Machine Corporation, Little Ferry, NJ (US)

( * ) Notice: Subject to any disclaimer, the term of this patent is extended or adjusted under 35 U.S.C. 154(b) by 354 days.

(21) Appl. No.: 18/216,305

(22) Filed: Jun. 29, 2023

(65) Prior Publication Data

US 2025/0003726 A1 Jan. 2, 2025

(51) Int. Cl.
*G01B 5/28* (2006.01)

(52) U.S. Cl.
CPC .................................... *G01B 5/28* (2013.01)

(58) Field of Classification Search
CPC .... G01B 5/28; G01B 7/34; A61C 3/00; A61C 19/04; A61C 19/043; B25H 7/04; B26F 1/14; B26F 1/32
See application file for complete search history.

(56) References Cited

U.S. PATENT DOCUMENTS 2,372,451 A * 3/1945 Reason .................... G01B 5/28 73/105
3,036,482 A * 5/1962 Kenworthy ............... B25C 1/02 606/100
3,805,391 A * 4/1974 Glasgow .................. B25H 7/04 33/41.6
3,935,640 A * 2/1976 Cohan ...................... A61C 3/00 433/150
4,048,723 A * 9/1977 Thorup .................. A61C 19/04 433/82
4,355,466 A * 10/1982 Quiring ..................... B26F 1/14 279/96
4,404,749 A * 9/1983 Emerson .................. B25F 1/02 30/366
4,743,198 A * 5/1988 Kennedy ................. A61C 3/00 433/143

(Continued)

OTHER PUBLICATIONS engineersedge.com, [online] "How to Use a Surface Roughness Comparator," available on or before Aug. 5, 2013, via Internet Archive: Wayback Machine URL <http://web.archive.org/web/20130805234217/https://www.engineersedge.com/manufacturing/how_to_use_a_surface_roughness_comparator_13071.htm>, retrieved on Aug. 24, 2023, URL<https://www.engineersedge.com/manufacturing/how_to_use_a_surface_roughness_comparator_13071.htm>, 3 pages.

(Continued)

*Primary Examiner* — Peter J Macchiarolo
*Assistant Examiner* — Anna Josephine Saunders
(74) *Attorney, Agent, or Firm* — Fish & Richardson P.C.

(57) ABSTRACT

A handheld tool for tactile sensing of surface roughness includes a handle, and a taper extending from an end of the handle, the taper narrowing from a first end of the taper to a second end of the taper. The first end of the taper is closer to the handle than is the second end. The handheld tool further includes a tip extending from the second end of the taper. A cross-sectional width of the tip is less than a cross-sectional width of the handle. The handle, the taper, and the tip are configured such that a force associated with movement of the tip across a rough surface is transmitted from the tip, through the taper, and to the handle for tactile sensing by a user holding the handle.

20 Claims, 4 Drawing Sheets

(56) References Cited

U.S. PATENT DOCUMENTS 5,096,420 A * 3/1992 Loewenthal ......... A61C 19/043 433/72
5,624,259 A * 4/1997 Heath ...................... A61C 3/00 433/141
5,913,682 A * 6/1999 Strate ....................... A61C 3/00 433/143
6,893,260 B2 * 5/2005 Barnes ..................... A61C 3/00 433/72
11,353,312 B2 * 6/2022 Izumi ....................... G01B 5/28
2003/0186195 A1 * 10/2003 Comfort .................. A61C 3/08 433/164
2003/0200666 A1 * 10/2003 Baker ...................... B25D 5/00 30/366
2012/0301848 A1 * 11/2012 O'Donnell ............... A61C 5/50 433/164
2025/0003726 A1 * 1/2025 Ferretti .................... G01B 5/28

OTHER PUBLICATIONS

Mitutoyo, "Portable Surface Roughness Tester Surftest SJ-210/310 Series," Bulletin No. 2307, Dec. 2021, 20 pages.
mitutoyo.com, [online] "Surface Roughness," available on or before Oct. 20, 2021 via Internet Archive: Wayback Machine URL <https://web.archive.org/web/20211020010823/https://www.mitutoyo.com/products/form-measurement-machine/surface-roughness/>, retrieved on Aug. 24, 2023, URL<https://www.mitutoyo.com/products/form-measurement-machine/surface-roughness/>, 4 pages.

* cited by examiner

TACTILE ROUGHNESS DETECTION TOOL

FIELD OF THE DISCLOSURE

Technologies are described for tactile sensing of surface roughness.

BACKGROUND

The roughness of a surface can be characterized by a roughness average (RA), the arithmetic average of surface height over a given area. In a machining context, holes drilled or bored in a component may be associated with target RA values, e.g., to facilitate smooth insertion of parts into the holes. RA may be measured using a profilometer or a surface roughness tester.

SUMMARY

According to some aspects of the disclosed technologies, a handheld tool for tactile sensing of surface roughness includes a handle, and a taper extending from an end of the handle, the taper narrowing from a first end of the taper to a second end of the taper. The first end of the taper is closer to the handle than is the second end. The handheld tool further includes a tip extending from the second end of the taper. A cross-sectional width of the tip is less than a cross-sectional width of the handle. The handle, the taper, and the tip are configured such that a force associated with movement of the tip across a rough surface is transmitted from the tip, through the taper, and to the handle for tactile sensing by a user holding the handle.

This and other handheld tools described herein can have one or more of at least the following characteristics.

In some implementations, at least a portion of the taper has a cross-sectional width that tapers at a rate between 0.005 and 0.02 inches per inch of length.

In some implementations, at least a portion of the taper has a cross-sectional width between 0.005 and 0.04 inches.

In some implementations, the tip extends transverse to the taper.

In some implementations, the tip is curved.

In some implementations, the tip has a constant cross-sectional width.

In some implementations, the taper includes: a first taper portion having a cross-sectional width that tapers at a first rate per inch of length, the first taper portion extending from the end of the handle; and a second taper portion having a cross-sectional width that tapers at a second rate per inch of length, the second taper portion extending to the tip. The second rate is less than the first rate.

In some implementations, the second taper portion extends from an end of the first taper portion to the tip.

In some implementations, the cross-sectional width of the second taper portion throughout the second taper portion is less than the cross-sectional width of the first taper portion throughout the first taper portion.

In some implementations, the first rate is between 0.15 and 0.5 inches per inch of length.

In some implementations, a length of the first taper portion is less than a length of the second taper portion.

In some implementations, the taper includes a third taper portion extending from an end of the first taper portion to the second taper portion. A length of the third taper portion is greater than a length of the first taper portion and greater than a length of the second taper portion.

In some implementations, the third taper portion has a constant cross-sectional width.

In some implementations, the taper has a circular cross-section with a narrowing diameter.

In some implementations, a cross-sectional width of the tip is between 0.005 and 0.025 inches.

In some implementations, a cross-sectional width of the taper is monotonically decreasing along an entire length from the first end of the taper to the second end of the taper.

In some implementations, the tip has a rounded end.

In some implementations, the tip has a pointed end.

In some implementations, a total length of the handheld tool is between 3.5 inches and 6 inches.

In some implementations, the handheld tool is composed of stainless steel, steel, or titanium.

Details of one or more implementations of the disclosed technologies are set forth in the accompanying drawings and the description below. Other features, aspects, descriptions and potential advantages will become apparent from the description, the drawings, and the claims.

Certain illustrative aspects of the disclosed technologies are described herein in connection with the following description and the accompanying figures. These aspects are, however, indicative of but a few of the various ways in which the principles of the disclosed technologies may be employed, and the disclosed technologies are intended to include all such aspects and their equivalents. Other advantages and novel features of the disclosed technologies may become apparent from the following detailed description when considered in conjunction with the figures and the claims.

DETAILED DESCRIPTION

Technologies described herein include handheld tools for tactile sensing of surface roughness. The handheld tools have combinations of parameters—such as shape, length, thickness/width, and/or material—that together facilitate transmission of forces from the tip of the tool to a user's hand holding the tool, permitting mechanical roughness sensing. As such, the tools described herein are suitable, in some implementations, for rapid, in situ testing of machined surfaces (such as surfaces inside drilled holes), without requiring use of bulky test equipment or removal of parts from machining equipment.

Figures 1A, 1B:
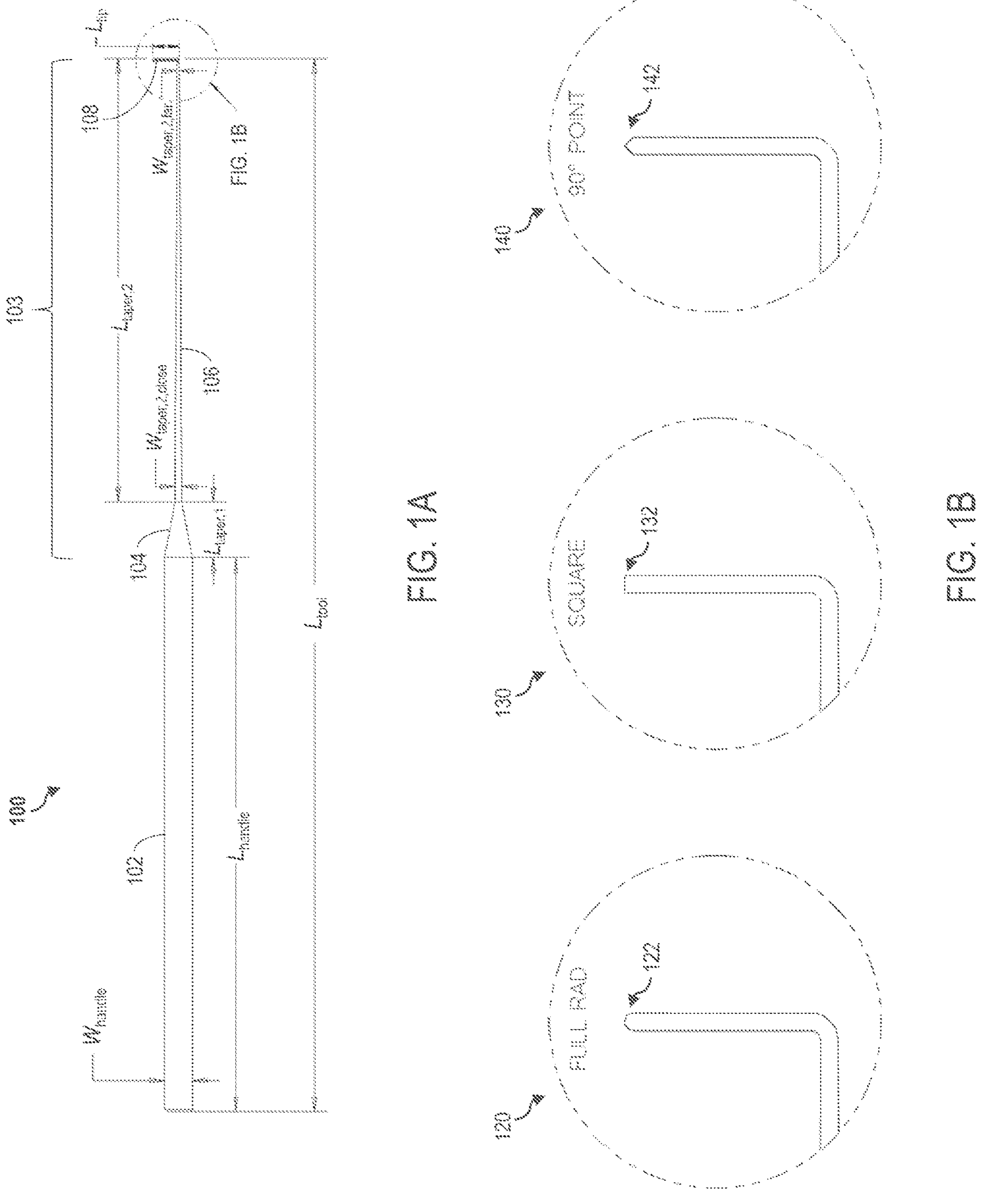
FIG. 1A is a diagram illustrating an example of a handheld roughness detection tool.
FIG. 1B is a diagram illustrating examples of tips of handheld roughness detection tools.

For example, as shown in FIG. 1A, a tool 100 is suitable for tactile sensing of surface roughness. The tool 100 includes, proceeding from a first end to a second end of the tool 100: a handle 102; a taper 103 including a first taper portion 104 and a second taper portion 106; and a tip 108 extending transverse to the taper 103 at the second end of the tool 100. The handle 102, the taper 103, and the tip 108 are configured such that a force from a rough surface in contact with the tip 108 is transmitted from the tip 108, through the taper 103, and to the handle 102, to be sensed by a user holding the handle 102. In this example, the handle 102 and the taper 103 extend parallel to one another in a single line; in some implementations, a bend and/or relative angle can be provided for one or both of the handle or the taper, and/or between the handle and the taper.

Figure 2:
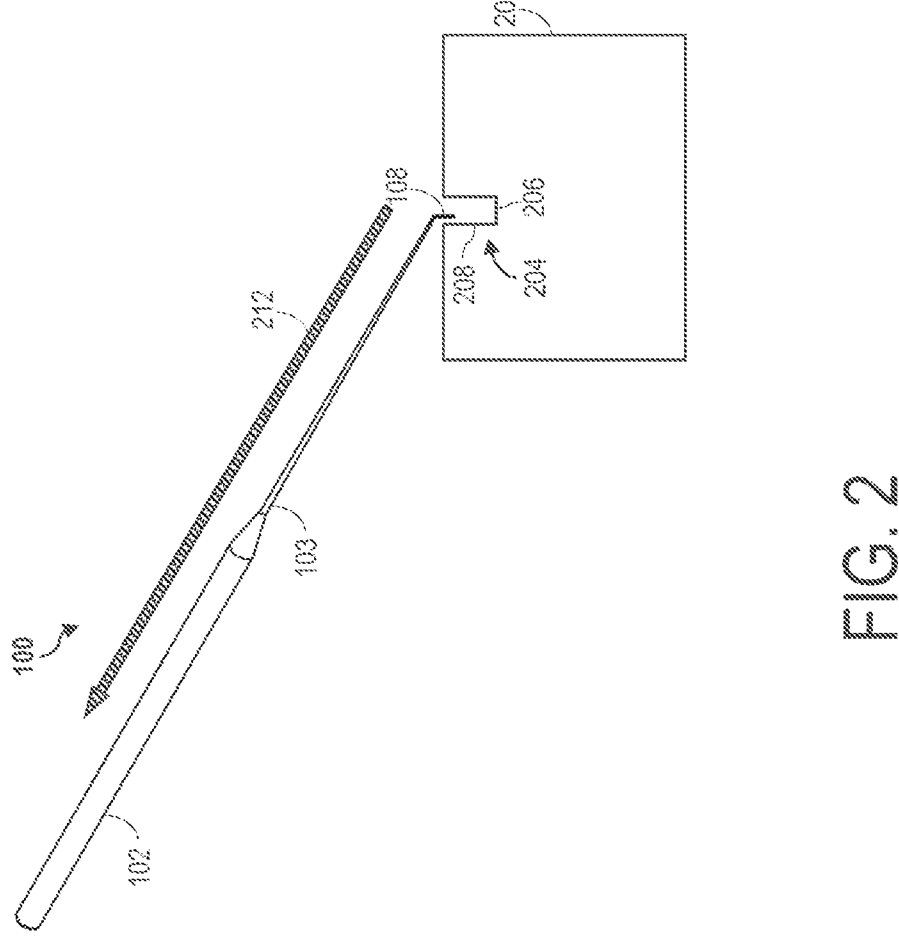
FIG. 2 is a diagram illustrating use of a handheld roughness detection tool.

For example, as shown in FIG. 2, the tool 100 can be handled so that the tip 108 is inserted inside a hole 204 in a part 202. For example, the part 202 can be held in a machine tool (e.g., a lathe), and the hole 204 can have been drilled in the part 202, e.g., as a screw-hole, a bolt-hole, a bore, etc. The tip 108 can be pressed and/or rubbed against a surface of the hole 204, such as a sidewall 208 or a bottom wall 206. A roughness of the surface moving against the tip 108 generates a force 212 that is transmitted from the tip 108, through the taper 103, and to the handle 102. For example, the tip 108 and the taper 103 (and, in some implementations, the handle 102) can be sufficiently flexible—e.g., based on their length, cross-sectional width, and/or material(s)—to transmit vibrations associated with the roughness of the surface.

A hand (not shown) of a user holding the handle 102 feels the force 212, and the user, based on this tactile response, can sense the approximate roughness of the surface of the hole 204. For example, the user is able to determine generally whether the surface is smooth or not, or whether the surface is smooth, somewhat rough, or very rough, in a non-quantitative manner. In many cases, this approximate, tactile sensing is sufficient to satisfy testing requirements, and more elaborate testing (e.g., profilometry) is not necessary. For example, a machinist can drill or bore a hole and, immediately afterwards, without removing the machined part from its holder, use the tool 100 to measure the surface roughness inside the hole. Based on the tactile feel provided by the tool 100, the machinist can make any necessary adjustments (e.g., use a different drill bit or different drill settings) to ensure that the surface is within a target machining tolerance.

The tools described herein are mechanical, e.g., rely on forces transmitted and sensed mechanically as opposed to electric signals indicative of surface roughness. This mode of operation can, in some cases, provide reduced tool size/weight, reduced tool cost, reduced tool complexity, and/or faster roughness sensing, compared to more complex electric roughness gauges.

Referring again to FIG. 1A, the handle 102 can have characteristics that provide ergonomic handling of the tool 100 while permitting force transmission through the handle 102, in some cases without compromising the compactness of the tool 100. A thicker handle 102 (larger cross-sectional width $W_{handle}$) may be useful for user comfort in manipulating the tool 100. However, a handle that is too thick may prevent force transmission, e.g., by distributing vibrations from the taper 103 across the handle and reducing the magnitude of vibrations felt by a user. Moreover, in some implementations, the tool 100 is suitable for use in narrow spaces, e.g., to be extended into a small gap between surfaces. In such cases, a narrower handle 102 can be desirable to fit the tool 100 into the narrow spaces. The length $L_{handle}$ of the handle 102 can also be a relevant consideration, e.g., to permit easy user manipulation of the tool 100.

In line with these objectives, in some implementations, the handle 102 has a cross-sectional width $W_{handle}$ (e.g., a diameter in implementations in which the handle 102 has a circular cross-section) between 0.075 inches and 0.3 inches, such as between 0.1 inches and 0.2 inches, or between 0.1 inches and 0.15 inches. In some implementations, $W_{handle}$ is about 0.125 inches. In some implementations, $L_{handle}$ is between 1.5 inches and 4 inches, such as between 2 inches and 3 inches or about 2.5 inches. It has been determined that these widths and/or lengths can facilitate effective roughness sensing and desirable ergonomics. However, other widths and/or lengths are also within the scope of this disclosure and may be advantageous for some applications.

The handle 102, in the illustrated example of the tool 100, has a uniform or substantially uniform width $W_{handle}$ along the length of the handle 102. In some implementations, the handle includes widening and/or tapering portion(s) along its length. In some implementations, the handle has a uniform width $W_{handle}$ along its length (in the example of FIG. 1A, the entire handle 102).

In some implementations, the handle 102 includes one or more features to improve grip. For example, the handle 102 can be knurled, grooved, and/or coated (e.g., coated with a grippable rubber).

Tools according to this disclosure include a taper 103 between the handle 102 and the tip 108. The taper, in various implementations, includes one, two, three, or more than three tapering portions, where different tapering portions may be distinguished from one another by different rates of taper (in cross-sectional width, e.g., diameter) per unit length. The presence of a taper facilitates force/vibration transmission from the tip to the handle while maintaining the mechanical integrity of the tool.

For example, as shown in FIG. 1A, the taper 103 includes a first taper portion 104, which extends from the close end of the handle 102 and is adjacent to the handle 102. The taper 103 further includes a second taper portion 106 that extends from the far end of the first taper portion 104 and is adjacent to the first taper portion 104. In this example, the second taper portion 106 extends to the tip 108, such that the tip 108 extends perpendicular to the far end of the second taper portion 106. In other examples (e.g., as described with respect to FIG. 3), one or more further taper portions can be present between the second taper portion and the tip.

The first taper portion 104 has a length $L_{taper,1}$ and has a cross-sectional width that narrows at a first constant rate per inch of length ($R_1$). The second taper portion 106 has a length $L_{taper,2}$ and has a cross-sectional width that narrows at a constant second rate per inch of length ($R_2$). The second taper portion 106 has, at its first end, a cross-sectional width $W_{taper,2,close}$ and, at its second end, a cross-sectional width $W_{taper,2,far}$, such that $R_2=(W_{taper,2,close}-W_{taper,2,far})/L_{taper,2}$. The first taper portion 104 has, at its first end, a cross-sectional width $W_{handle}$ and, at its second end, a cross-sectional width $W_{taper,2,close}$. The values of $R_1$ and $R_2$ are constant in the example of FIG. 1A, which, in some cases, may provide for more uniform/predictable force transmission and/or increase the ease of manufacturing the tool 100. In other implementations, a rate of narrowing of one or more taper portions (e.g., $R_1$ and/or $R_2$) varies along a length of the one or more taper portions.

The rates of narrowing described herein, such as the examples of rates of narrowing discussed with respect to FIGS. 1A, 3, and 4A-4B, in some implementations are constant rates of narrowing for a portion of a taper or tip. For example, when a portion of a taper is described as narrowing at a rate R, in some implementations, the portion of the taper can narrow at the rate R along the entire length of the portion of the taper.

In some implementations, the cross-sectional width of the taper monotonically decreases along an entire length of the taper. For example, in the case of the tool 100, all cross-sectional widths of the second taper portion 106 are less than all cross-sectional widths of the first taper portion 104. Likewise, in some implementations having an additional third taper portion after the second taper portion, all cross-sectional widths of the third taper portion can be less than all cross-sectional widths of the first and second taper portions. In some implementations, the taper's cross-sectional width is decreasing along the entire length of the taper. However, in some implementations, the taper includes one or more constant-cross-sectional width portions, such that the taper does not narrow along its entire length.

In some implementations, the taper portions 104, 106 follow a short/long arrangement in a close-to-far direction, e.g., $L_{taper,1}<L_{taper,2}$. Moreover, in some implementations, $R_1>R_2$, e.g., the rate of narrowing of the first taper portion 104 (e.g., a constant rate) is greater than the rate of narrowing of the second taper portion 106 (e.g., a constant rate). The inclusion of one or both of these characteristics in the tool 100 can, in some cases, (i) make use of the tool 100 more ergonomic, e.g., make it easier to maneuver the tool 100 into narrow spaces and reach the tip 108 into holes, and/or (ii) improve the tactile response of the tool 100 for improved roughness sensing. For example, regarding the latter advantage, the longer, more gradually-narrowing second taper portion 106 can have sufficient flexibility to transmit vibrations from the tip 108 with relatively low loss, and the shorter length of the first taper portion 104 can allow these vibrations to be transmitted to the handle 102 with relatively low loss despite the first taper portion 104 thickening towards the handle 102.

In addition to, or instead of, the advantages provided by this general arrangement of the taper 103, in some implementations specific geometric value(s) of a taper (e.g., whether the taper has one, two, three, or more than three taper portions) can provide effective force transmission (for accurate tactile sensing of surface roughness) while maintaining the mechanical integrity of the tool 100 (e.g., reducing or preventing breaking of the tool 100 and allowing the tool 100 to be maneuvered without undesirably bending away from desired positions).

For example, in some implementations, $L_{taper,1}$ is between 0.15 inches and 0.4 inches, e.g., between 0.2 inches and 0.3 inches, such as about 0.25 inches. In some implementations, $L_{taper,2}$ is between 1 inches and 3 inches, e.g., between 1.5 inches and 2.5 inches, such as about 2 inches. In some implementations, one or more of these values can provide the force transmission, flexibility, and/or mechanical integrity advantages described above.

In some implementations, at least a portion of the taper has a cross-sectional width between 0.005 and 0.04 inches, such as between 0.01 and 0.03 inches. For example, in some implementations, at least some of the second taper portion 106, or all of the second taper portion 106, can have a cross-sectional width satisfying these values. For example, $W_{taper,2,close}$ can be about 0.03 inches, and $W_{taper,2,far}$ can be 0.01 inches. In some implementations, one or more of these values can provide the force transmission, flexibility, and/or mechanical integrity advantages described above.

In some implementations, at least a portion of the taper has a cross-sectional width between 0.02 and 0.15 inches, such as between 0.03 and 0.125 inches. For example, in some implementations, at least some of the first taper portion 104, or all of the first taper portion 104, can have a cross-sectional width satisfying these values. For example, $W_{handle}$ can be about 0.125 inches, and $W_{taper,2,close}$ can be about 0.03 inches. In some implementations, one or more of these values can provide the force transmission, flexibility, and/or mechanical integrity advantages described above.

In some implementations, at least a portion of the taper has a cross-sectional width that tapers at a rate between 0.15 or 0.2 and 0.5 inches per inch of length, e.g., between 0.3 and 0.4 inches per inch of length, such as about 0.38 inches per inch of length. For example, these values can apply to $R_1$, the rate of narrowing of the cross-sectional width of the first taper portion 104. In some implementations, one or more of these values can provide the force transmission, flexibility, and/or mechanical integrity advantages described above.

In some implementations, at least a portion of the taper has a cross-sectional width that tapers at a rate between 0.005 and 0.02 inches per inch of length, such as between 0.0075 and 0.015 inches per inch of length, e.g., about 0.01 inches per inch of length. For example, these values can apply to $R_2$, the rate of narrowing of the cross-sectional width of the second taper portion 106. In some implementations, one or more of these values can provide the force transmission, flexibility, and/or mechanical integrity advantages described above.

The cross-sectional shape of the taper can vary in different implementations. In some implementations, the taper has a circular cross-section, and the narrowing cross-sectional widths of the taper are narrowing diameters. In some implementations, the taper has a different cross-sectional shape, such as square, rectangular, or elliptical.

Referring again to FIG. 1A, the tip 108 extends transverse to the taper 103, from a far end of the taper 103. For example, in some implementations, the tip 108 extends orthogonally to the taper 103, e.g., an angle between the tip 108 and the taper 103 is 90°. In some implementations, the angle is between 60° and 120°. These values can facilitate the insertion of the tip 108 into holes, as shown in FIG. 2. In other implementations, the tip extends parallel to the taper, e.g., as described in reference to FIGS. 3 and 4A-4B.

Because the tip 108 is configured to be in direct contact with a surface to sense the roughness of the surface, geometric parameters of the tip 108 can be set to provide effective force/vibration transmission while retaining the mechanical integrity of the tip 108, and to provide a useful length of the tip 108 to allow the tip 108 to probe surfaces of interest.

For example, in some implementations, a cross-sectional width of the tip 108 (e.g., diameter) $W_{tip}$ is between 0.005 and 0.03 inches, such as between 0.01 and 0.025 inches. In some implementations, the tip 108 has a uniform cross-sectional width that matches the cross-sectional width of the taper 103 adjacent to the tip 108 (in the example of FIG. 1A, $W_{taper,2,far}$). In some implementations, a cross-sectional width of the tip 108 varies along a length of the tip 108 $L_{tip}$. The cross-sectional width of the tip can be less than the cross-sectional width of the handle. In some implementations, the cross-sectional width of the tip is less than the cross-sectional width of the taper throughout the taper. In some implementations, a length of the tip 108 $L_{tip}$ is between 0.05 and 0.15 inches, such as between 0.1 and 0.13 inches, e.g., about 0.12 inches. In some implementations, one or more of these values can provide the force transmission, flexibility, and/or mechanical integrity advantages described above.

A shape of an end of the tip 108 can vary in different implementations. FIG. 1B illustrates several non-limiting examples of these shapes, shown in profile. For example, tip 120 has a rounded end 122 (e.g., a "full radius" shape); tip 130 has a flat end 132 (e.g., corresponding to a square/ rectangular cross-section); and tip 140 has a pointed end 142 (e.g., a 90° point or another angle point). As discussed in reference to Table 1, in some cases, particular tip shape(s) can enhance tactile sensing of particular surface roughness (es).

One or more portions of the tool 100, such as the handle 102, the taper 103, and/or the tip 108, can be composed of one or more metals. For example, the metal(s) can include titanium, steel, and/or stainless steel, which, in some implementations, can provide a desirable combination of efficient force transmission and ease of manufacture.

Figure 3:
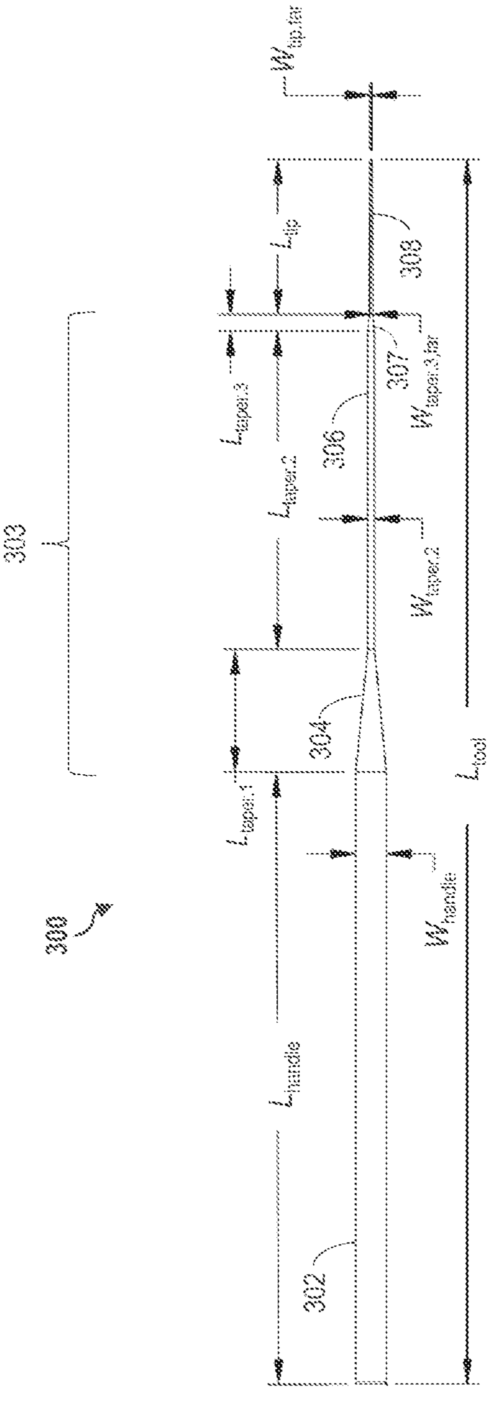
FIG. 3 is a diagram illustrating an example of a handheld roughness detection tool.

In some implementations, a taper includes three taper portions. For example, as shown in FIG. 3, a tool 300 includes a handle 302, a taper 303, and a tip 308. The tip 308 extends from a far end of the taper 303 and parallel to the taper 303, as opposed to transverse to the taper as in the examples of FIGS. 1A-1B. Except where indicated otherwise, the handle 302 and tip 308 can have characteristics (e.g., dimension(s), shape(s), and/or material(s)) as described for the handle 102 and tip 108.

The taper 303 includes a first taper portion 304, a second taper portion 306, and a third taper portion 307, having respective lengths $L_{taper,1}$, $L_{taper,2}$, and $L_{taper,3}$. In some implementations, as in this example, the taper portions 304, 306, 307 follow a short/long/short pattern in which $L_{taper,2}>L_{taper,1}$ and $L_{taper,2}>L_{taper,3}$. In some cases, this pattern can promote improved force transmission from the tip 308 to the handle 302.

In the taper 303, the first taper portion 304 and the third taper portion 307 have narrowing cross-sectional widths along their respective lengths, while the second taper portion 306 has a uniform cross-sectional width $W_{taper,2}$. The first taper portion 304 narrows from width $W_{handle}$ (the width of the handle 302) to width $W_{taper,2}$, and the third taper portion 307 narrows from width $W_{taper,2}$ to width $W_{taper,3,far}$. In this example, $W_{taper,3,far}<W_{taper,2}<W_{handle}$, such that the cross-sectional width of the taper 303 is either constant or narrowing along the entire length of the taper 303 in the close-to-far direction. Although $W_{taper,2}$ is constant in this example, in some implementations, the middle taper portion of three taper portions can be narrowing along some or all of its length, e.g., such that the taper as a whole can be narrowing along its entire length. For example, the middle taper portion can narrow at a rate different from rates of narrowing of the first and third taper portions. Moreover, in some implementations the first and/or third taper portion of three taper portions can have a uniform cross-sectional width.

As discussed with respect to the tool 100, dimensions of the tool 300 can vary across different implementations. In some implementations, the length $L_{taper,1}$ of the first taper portion 304 is between 0.3 and 0.7 inches, e.g., between 0.4 and 0.6 inches, such as 0.5 inches. In some implementations, a rate of narrowing of the cross-sectional width of the first taper portion 304 is between 0.15 inches and 0.25 inches per inch of length, such as between 0.175 inches and 0.225 inches per inch of length or between 0.175 inches and 0.20 inches per inch of length. For example, the first taper portion 304 can narrow from $W_{handle}$=0.125 inches to $W_{taper,2}$=0.027 inches. In some implementations, the length $L_{taper,2}$ of the second taper portion 306 is between 1.0 and 1.5 inches, e.g., between 1.2 and 1.4 inches, such as 1.3 inches. In some implementations, the cross-sectional width $W_{taper,2}$ of the second taper portion 306 is between 0.02 and 0.04 inches, e.g., between 0.025 and 0.035 inches, such as 0.03 inches or 0.027 inches. In some implementations, the length $L_{taper,3}$ of the third taper portion 307 is between 0.04 and 0.1 inches, e.g., between 0.05 and 0.09 inches or between 0.06 and 0.08 inches, such as 0.07 inches or 0.068 inches. In some implementations, a rate of narrowing of the cross-sectional width of the third taper portion 307 is between 0.1 inches and 0.3 inches per inch of length, e.g., between 0.15 inches and 0.25 inches per inch of length, such as 0.2 inches per inch of length. For example, the third taper portion 307 can narrow from $W_{taper,2}$=0.027 inches to $W_{taper,3,far}$=0.013 inches. In some implementations, the length $L_{tip}$ of the tip 308 is between 0.4 inches and 0.8 inches, such as between 0.5 inches and 0.7 inches, e.g., between 0.6 inches and 0.65 inches. The tip 308, in some implementations, tapers from cross-sectional width $W_{taper,3,far}$ to $W_{tip,far}$. In some implementations, a rate of narrowing of the tip 308 is between 0.005 inches per inch of length and 0.02 inches per inch of length, e.g., between 0.005 inches and 0.015 inches per inch of length, such as 0.01 inches per inch of length. In some implementations, $W_{tip,far}$ is between 0.005 and 0.01 inches, e.g., between 0.006 and 0.008 inches, such as 0.007 inches. In some implementations, one or more of these values can provide the force transmission, flexibility, and/or mechanical integrity advantages described above.

Although the three-taper-portion tool 300 is shown to have a tapering tip 308, in some implementations a tactile roughness sensing tool with three taper portions has a non-tapering (uniform width) tip. Moreover, although the three-taper-portion tool 300 is shown to have a tip 308 extending parallel to the handle 302 and the taper 303, in some implementations a tactile roughness sensing tool with three taper portions, or more, has a tip that extends transverse to the taper 303, as described for the tip 108.

Figures 4A, 4B:
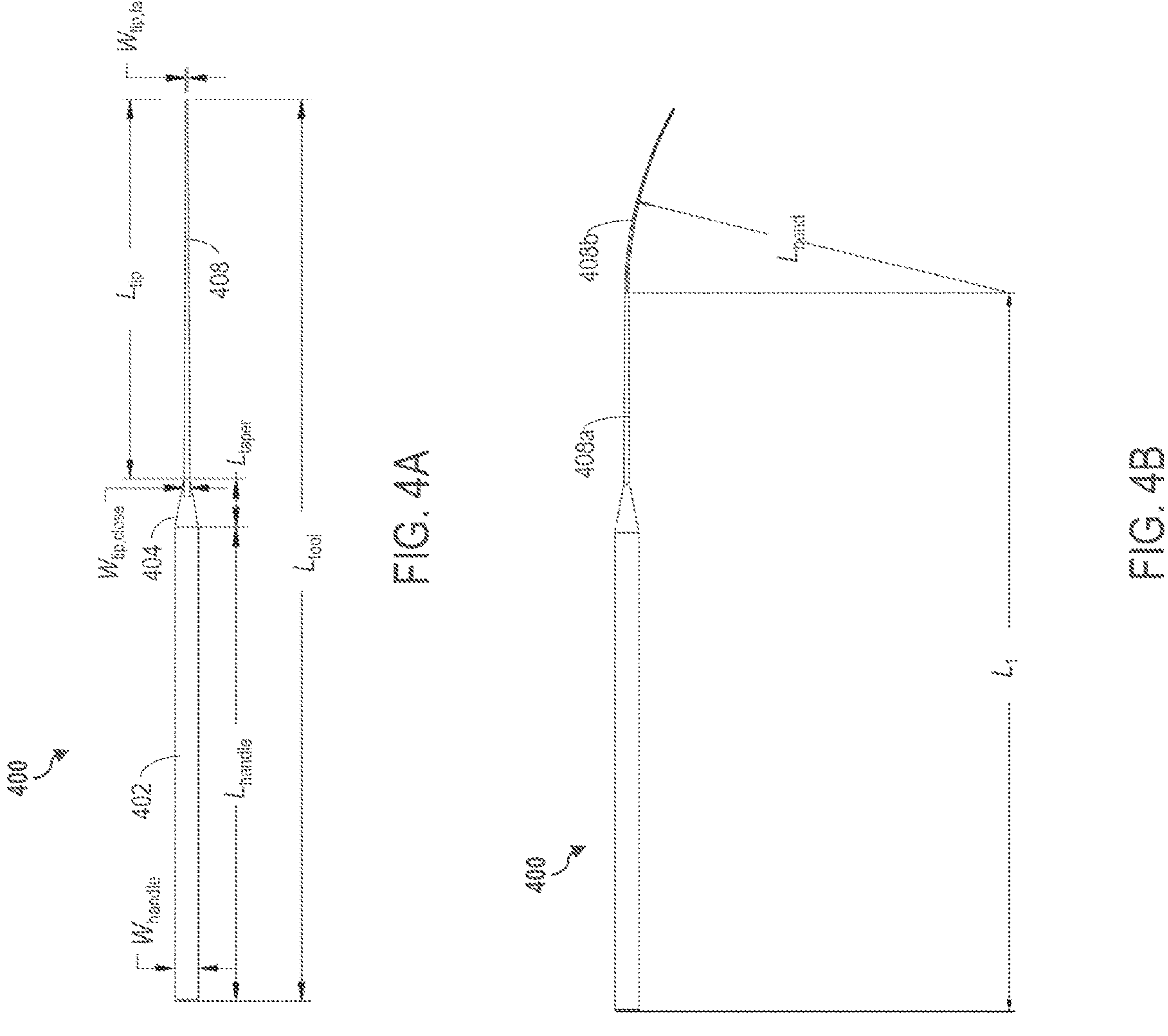
FIGS. 4A-4B are diagrams illustrating an example of a handheld roughness detection tool.

In some implementations, a portion of a tactile roughness sensing tool is curved. For example, FIGS. 4A-4B illustrate an example of a tool 400 having a handle 402, a taper 404, and a curved, tapering tip 408. In FIG. 4A, the tool 400 is shown in straightened-out form (e.g., bent to be straight), while in FIG. 4B the tool 400 is shown in its natural curved state. Except where indicated otherwise, the handle 402, taper 404, and tip 408 can have characteristics (e.g., dimension(s), shape(s), and/or material(s)) as described for the handles 102, 302, the tapers 103, 303, and the tips 108, 308.

In this example, the taper 404 includes a single taper portion that narrows along its length. However, in other implementations, a tool can have a curved tip and a taper with multiple taper portions, e.g., a taper as described for taper 103 or taper 303. Moreover, although the tip 308 is curved and tapering, in some implementations a tip can be curved and non-tapering (e.g., have a uniform thickness along its length).

In some implementations, the taper 404 has a length $L_{taper}$ between 0.15 and 0.35 inches, e.g., between 0.2 and 0.3 inches, such as 0.25 inches. In some implementations, the taper 404 has a cross-sectional width $W_{taper}$ that narrows at a rate between 0.25 inches and 0.5 inches per inch of length, e.g., between 0.35 and 0.45 inches per inch of length, such as 0.38 inches. For example, the taper 404 can narrow from $W_{handle}$=0.125 inches to $W_{tip,close}$=0.03 inches. In some implementations, the tip 408 has a length $L_{tip}$ between 1 and 3 inches, e.g., between 1.5 and 2.5 inches, such as 2.0 inches. In some implementations, the tip 408 narrows at a rate between 0.005 inches per inch of length and 0.015 inches per inch of length, such as 0.01 inch per inch of length. For example, the tip 408 can narrow from $W_{tip,close}$=0.03 inches to $W_{tip,far}$=0.01 inches. $W_{tip,far}$, in some implementations, is between 0.005 and 0.02 inches, e.g., between 0.005 and 0.015 inches, such as 0.01 inches.

As shown in FIG. 4B, in the natural resting state of the tool 400, the tip 408 includes a straight portion 408*a* and a curved portion 408*b*. The curved portion 408*b* is defined by a radius of curvature $L_{bend}$. In some implementations, $L_{bend}$ is within 1 inch or within 2 inches of $L_{tool}$, the total length of the tool 400. In some implementations, $L_{bend}$ is between 3 and 5 inches. The straight portion 408*a* extends to a length $L_1$ from a close end of the tool 400, such that the curved portion 408*b* has length $L_{tool}-L_1$. In some implementations, $L_1$ is within 2 inches or within 1 inch of $L_{tool}$. For example, the length of the curved portion 408*b* can be between 0.5 inches and 2 inches, such as 1 inch or 1.5 inches. In some implementations, one or more of these and other values disclosed with respect to FIGS. 4A-4B can provide the force transmission, flexibility, and/or mechanical integrity advantages described above.

For purposes of this disclosure, it has been recognized that some tip shapes, taper configurations, and/or tool materials may be associated with improved tactile sensing of particular surface roughnesses. For example, a first combination of tip shape, taper configuration, and/or tool material may provide a detectable tactile response difference between two first RA values $RA_1$ and $RA_2$ and a less detectable tactile response difference between two second RA values $RA_3$ and $RA_4$, while a second combination of tip shape, taper configuration, and/or tool material may provide a detectable tactile response difference between $RA_3$ and $RA_4$ and a less detectable tactile response difference between $RA_1$ and $RA_2$. Accordingly, a suitable tool can be used for each target RA value. For example, in a situation in which $RA_1$=4 micro-inches, $RA_2$=12 micro-inches, $RA_3$=40 micro-inches, and $RA_4$=100 micro-inches, a tool having the first combination of parameters can be used to test whether a surface has a roughness less than 8 micro-inches, and a tool having the second combination of parameters can be used to test whether a surface has a roughness less than 63 micro-inches.

Non-limiting examples of tool parameters, along with corresponding RA tolerances that the parameters may be particularly effective at gauging, are provided in Table 1 below. For example, in some implementations, thicker tip cross-sectional widths (where the values in Table 1 are for a constant cross-sectional tip width $W_{tip}$ or a cross-sectional width at the tip's far end, $W_{tip,far}$) are more effective for gauging rougher surfaces, with other parameters held constant. In some implementations, stainless steel tips and tapers are effective at gauging rougher surfaces, and titanium tips and tapers are effective at gauging smoother surfaces. In some implementations, pointy tips (e.g., as shown for tip 140) are effective at gauging smooth surfaces; flat tips (e.g., as shown for tip 130) are effective at gauging moderately rough surfaces; and round tips (e.g., as shown for tip 120) are effective at gauging rougher surfaces. In some implementations, a taper having two taper portions with shorter and longer lengths, respectively (e.g., as described for the tool 100) is effective at gauging smoother surfaces, and a taper having three taper portions with shorter, longer, and shorter lengths, respectively (e.g., as described for the tool 300) is effective at gauging rougher surfaces. Other combinations of tip cross-sectional width, material, tip shape, and taper configuration are also within the scope of this disclosure, and the characteristics shown in Table 1 need not be used together in combination to provide sensing advantages in some implementations. For example, in some implementations, a pointy tip shape is advantageous for sensing smoother surfaces, even if the taper has three portions and/or even if the tip is composed of stainless steel.

Although the materials are described as being for the tip and taper, in some implementations the handle can be composed of the same material, e.g., when the tool includes a single machined body forming the handle, taper, and tip. Besides titanium and stainless steel, other examples of possible materials for the tool include steel and plastic; other materials are also within the scope of this disclosure.

TABLE 1

| TIP WIDTH (in) | TIP AND TAPER MATERIAL | TIP SHAPE | # TAPER PORTIONS (t.p.) (RELATIVE LENGTHS FROM HANDLE) | SURFACE FINISH (RA SCALE, μin) |
|---|---|---|---|---|
| .007-. 012 (e.g., 0.010) | Titanium | Point | 2 t.p. (short then long) | ≤8 Ra |
| .013-. 017 (e.g., 0.015) | Titanium | Point | 2 t.p. (short then long) | >8 Ra-32 Ra |
| 008-. 012 (e.g., 0.010) | Titanium | Flat | 2 t.p. (short then long) | >32 Ra-63 Ra |
| 013-. 017 (e.g., 0.015) | Titanium | Flat | 3 t.p. (short then long then short) | >63 Ra-125 Ra |
| 013-. 017 (e.g., 0.015) | Stainless steel | Round | 3 t.p. (short then long then short) | >125 Ra-250 Ra |
| .022-. 028 (e.g., 0.025) | Stainless steel | Round | 3 t.p. (short then long then short) | >250 Ra |

Accordingly, handheld tools for tactile sensing of surface roughness can be used for efficient and rapid surface testing. In some implementations, a total length $L_{tool}$ of the handheld tool (for any of the examples described herein, such as tools 100, 300, or 400) is between 3.5 inches and 6 inches, e.g., between 4 inches and 5 inches, such as 4.75 inches, facilitating ease of use in tight spaces and efficient force transmission from the tip to the handle.

In some implementations, the tools described herein provide audible feedback based on surface roughness. For example, the vibrations transmitted from the tip to the handle, and/or the vibrations of the tip and/or the taper, can cause the tool to make a sound, e.g., a scratching sound as the tip is rubbed against the surface. A level of the audible feedback increases with increasing surface roughness, such that the audible feedback can be used instead of, or in conjunction with, the tactile response to determine the surface roughness. In some implementations, the tool parameters described herein (e.g., tip and/or taper geometry and/or material) can increase, advantageously, the noise level of the audible feedback and/or make the audible feedback more responsive to particular surface roughnesses.

In some implementations, the tools described herein can be used to obtain quantitative information about surface roughness. For example, multiple tools having different characteristics (e.g., tip cross-sectional width) can be used in sequence to test a surface. Each of the multiple tools is configured to provide a detectable tactile response for roughnesses at or above a certain value. For example, as shown in Table 1, a first tool can provide a tactile response at 8 Ra, and a second tool can provide a tactile response at 32 Ra. The multiple tools are used in a sequence of increasing Ras that provide tactile response, until a tactile response is detected; for example, the tool that provides a tactile response at 8 Ra can be used first, and then the tool that provides a tactile response at 32 Ra can be used. Based on this progressive increase in detectable Ra, when a tactile response is detected, it can be determined that the Ra of the surface generally corresponds to the detectable Ra of the latest-used tool, because prior tools (with smaller detectable Ras) did not provide a response. Accordingly, the tools described herein can provide at least approximate quantitative measures of surface roughness.

A few implementations have been described in detail above, and various modifications are possible. While this specification contains many specifics, these should not be construed as limitations on the scope of what may be claimed, but rather as descriptions of features that may be specific to particular implementations. Certain features that are described in this specification in the context of separate embodiments can also be implemented in combination in a single implementation. For example, a taper or taper portion described with respect to one example can be incorporated into another example, and a tip described with respect to one example can be incorporated into another example, without departing from the scope of this disclosure. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Other implementations also fall within the scope of the claims.

What is claimed is:

1. A handheld tool for tactile sensing of surface roughness, comprising:

a handle;

a taper extending from an end of the handle, the taper narrowing from a first end of the taper to a second end of the taper, wherein the first end of the taper is closer to the handle than is the second end, wherein the taper comprises:

a first taper portion having a cross-sectional width that tapers at a first constant rate per inch of length from a proximal end of the first taper portion to a distal end of the first taper portion, the first taper portion extending from the end of the handle, and a second taper portion having a cross-sectional width that tapers at a second constant rate per inch of length from a proximal end of the second taper portion to a distal end of the second taper portion, the second taper portion extending from the first taper portion to a tip, wherein the first constant rate is in a range from 0.3 to 0.4 inches per inch of length, and wherein the second constant rate is in a range from 0.005 to 0.02 inches per inch of length; and the tip, wherein the tip extends from the distal end of the second taper portion, wherein a cross-sectional width of the tip is less than a cross-sectional width of the handle, and wherein the handle, the taper, and the tip are configured such that a force associated with movement of the tip across a rough surface is transmitted from the tip, through the taper, and to the handle for tactile sensing by a user holding the handle.

2. The handheld tool of claim 1, wherein a length of the first taper portion is in a range from 0.2 to 0.3 inches, and wherein a length of the second taper portion is in a range from 1.5 to 2.5 inches.

3. The handheld tool of claim 1, wherein the cross-sectional width of the first taper portion is in a range from 0.03 to 0.125 inches through an entirety of a length of the first taper portion.

4. The handheld tool of claim 1, wherein the tip extends transverse to the taper.

5. The handheld tool of claim 1, wherein the tip has a constant cross-sectional width.

6. The handheld tool of claim 1, wherein the cross-sectional width of the second taper portion throughout the second taper portion is less than the cross-sectional width of the first taper portion throughout the first taper portion.

7. The handheld tool of claim 1, wherein a length of the first taper portion is less than a length of the second taper portion.

8. The handheld tool of claim 1, wherein the cross-sectional width of the tip is between 0.005 and 0.025 inches.

9. The handheld tool of claim 1, wherein the tip has a pointed end or a flat end, is composed of titanium, and has a tip width in one of the following ranges:

0.007 to 0.012 inches, or 0.013 to 0.017 inches.

10. The handheld tool of claim 1, wherein a total length of the handheld tool is between 3.5 inches and 6 inches.

11. The handheld tool of claim 1, wherein the handheld tool is composed of stainless steel, steel, or titanium.

12. A handheld tool for tactile sensing of surface roughness, comprising:

a handle;

a taper extending from an end of the handle, the taper narrowing from a first end of the taper to a second end of the taper, wherein the first end of the taper is closer to the handle than is the second end, wherein the taper comprises:

a first taper portion having a cross-sectional width that tapers at a first constant rate per inch of length from a proximal end of the first taper portion to a distal end of the first taper portion, the first taper portion extending from the end of the handle, a second taper portion having a uniform cross-sectional width in a range from 0.02 to 0.04 inches, the second taper portion extending from the distal end of the first taper portion, and a third taper portion having a cross-sectional width that tapers at a second constant rate per inch of length from a proximal end of the third taper portion to a distal end of the third taper portion, wherein the third taper portion extends from the second taper portion to a tip, wherein the first constant rate is in a range from 0.15 to 0.25 inches per inch of length, and wherein the second constant rate is in a range from 0.1 to 0.3 inches per inch of length; and the tip, wherein the tip extends from the distal end of the third taper portion, wherein a cross-sectional width of the tip is less than a cross-sectional width of the handle, and wherein the handle, the taper, and the tip are configured such that a force associated with movement of the tip across a rough surface is transmitted from the tip, through the taper, and to the handle for tactile sensing by a user holding the handle.

13. The handheld tool of claim 12, wherein the tip is composed of titanium, has a flat end, and has a tip width in a range from 0.013 to 0.017 inches.

14. The handheld tool of claim 12, wherein the tip is composed of stainless steel, has a round end, and has a tip width in one of the following ranges:

0.013 to 0.017 inches, or 0.022 to 0.028 inches.

15. The handheld tool of claim 12, wherein a length of the second taper portion is greater than respective lengths of the first taper portion and the third taper portion.

16. The handheld tool of claim 12, wherein a length of the second taper portion is in a range from 1.0 to 1.5 inches.

17. The handheld tool of claim 16, wherein a length of the third taper portion is in a range from 0.04 to 0.1 inches.

18. The handheld tool of claim 17, wherein a length of the first taper portion is in a range from 0.3 to 0.7 inches.

19. A handheld tool for tactile sensing of surface roughness, comprising:

a handle;

a taper extending from an end of the handle, the taper narrowing from a first end of the taper to a second end of the taper, wherein the first end of the taper is closer to the handle than is the second end; and a tip extending from the second end of the taper, wherein a cross-sectional width of the tip is less than a cross-sectional width of the handle, wherein the handle, the taper, and the tip are configured such that a force associated with movement of the tip across a rough surface is transmitted from the tip, through the taper, and to the handle for tactile sensing by a user holding the handle, and wherein the tip comprises a curved portion that is bendable, and wherein a radius of curvature of the curved portion of the tip is in a range from 3 inches to 5 inches.

20. The handheld tool of claim 19, wherein the radius of curvature of the curved portion is within two inches of a total length of the handheld tool.

* * * * *